(12) United States Patent
Danoyan et al.

(10) Patent No.: US 8,271,785 B1
(45) Date of Patent: Sep. 18, 2012

(54) SYNTHESIZED ROOT PRIVILEGES

(75) Inventors: Alexander Y. Danoyan, Riverton, UT (US); Scott A. Isaacson, Woodland Hills, UT (US)

(73) Assignee: Novell, Inc., Provo, UT (US)

( * ) Notice: Subject to any disclaimer, the term of this patent is extended or adjusted under 35 U.S.C. 154(b) by 1650 days.

(21) Appl. No.: 11/115,810

(22) Filed: Apr. 26, 2005

Related U.S. Application Data

(63) Continuation-in-part of application No. 11/018,514, filed on Dec. 20, 2004, now abandoned.

(51) Int. Cl.
*G06F 21/00* (2006.01)

(52) U.S. Cl. .......................... 713/167; 726/28

(58) Field of Classification Search .......... 713/166–167, 713/182; 726/6–7, 26–29
See application file for complete search history.

(56) References Cited

U.S. PATENT DOCUMENTS

| | | | |
|---|---|---|---|
| 4,918,653 A | 4/1990 | Johri et al. | |
| 5,664,206 A | 9/1997 | Murow et al. | |
| 5,713,024 A | 1/1998 | Halladay | |
| 5,721,824 A | 2/1998 | Taylor | |
| 5,732,212 A | 3/1998 | Perholtz et al. | |
| 5,748,890 A | 5/1998 | Goldberg et al. | |
| 5,835,777 A | 11/1998 | Staelin | |
| 5,894,571 A | 4/1999 | O'Connor | |
| 5,901,227 A * | 5/1999 | Perlman | 713/157 |
| 5,950,010 A | 9/1999 | Hesse et al. | |
| 5,961,593 A * | 10/1999 | Gabber et al. | 709/219 |
| 6,144,959 A | 11/2000 | Anderson et al. | |
| 6,161,139 A | 12/2000 | Win et al. | |
| 6,205,579 B1 | 3/2001 | Southgate | |
| 6,256,774 B1 | 7/2001 | O'Leary et al. | |
| 6,259,442 B1 | 7/2001 | Britt et al. | |
| 6,282,711 B1 | 8/2001 | Halpern et al. | |
| 6,301,707 B1 | 10/2001 | Carroll et al. | |
| 6,324,691 B1 | 11/2001 | Gazdik | |
| 6,353,926 B1 | 3/2002 | Parthesarathy et al. | |

(Continued)

FOREIGN PATENT DOCUMENTS
GB 2419711 5/2006

OTHER PUBLICATIONS

Tanenbaum, Andrew; Modern Operating Systems; 2nd ed.; 2001; Prentice Hall, Upper Saddle River, NJ; pp. 753-757.

(Continued)

*Primary Examiner* — Hadi Armouche
(74) *Attorney, Agent, or Firm* — Marger Johnson & McCollom, P.C.

(57) ABSTRACT

Users provide their standard username and password and are authenticated to the system. The system then determines from an object set, such as a container hierarchy, whether the user should have special administrative privileges for any of the resources on the machine to which they are logging in. These administrative privileges can be determined from configurable sets of pre-existing relationships between the user and resources on the system, stored within the object set. If the user is an administrator, then the system sets the UID number for that user to the UID number for administrator users. The system can even be configured to set the administrative UID to be the UID for the super-user "root" (typically, zero). If the user has no administrative privileges, the system sets the UID number for that user to the user's standard UID number.

30 Claims, 6 Drawing Sheets

U.S. PATENT DOCUMENTS

| | | | |
|---|---|---|---|
| 6,367,075 B1 * | 4/2002 | Kruger et al. | 717/169 |
| 6,421,777 B1 | 7/2002 | Pierre-Louis et al. | |
| 6,457,130 B2 | 9/2002 | Hitz et al. | |
| 6,460,060 B1 | 10/2002 | Maddalozzo et al. | |
| 6,493,871 B1 | 12/2002 | McGuire et al. | |
| 6,539,473 B1 | 3/2003 | Hubacher et al. | |
| 6,539,539 B1 | 3/2003 | Larsen et al. | |
| 6,606,744 B1 | 8/2003 | Mikurak | |
| 6,615,406 B1 | 9/2003 | Amberg et al. | |
| 6,651,085 B1 | 11/2003 | Woods | |
| 6,725,452 B1 | 4/2004 | Te'eni et al. | |
| 6,728,711 B2 | 4/2004 | Richard | |
| 6,735,757 B1 | 5/2004 | Kroening et al. | |
| 6,775,829 B1 | 8/2004 | Kroening | |
| 6,799,208 B1 | 9/2004 | Sankaranarayan et al. | |
| 6,892,382 B1 | 5/2005 | Hapner et al. | |
| 6,928,644 B1 | 8/2005 | Kroening et al. | |
| 6,981,028 B1 | 12/2005 | Rawat et al. | |
| 7,006,993 B1 | 2/2006 | Cheong et al. | |
| 7,013,461 B2 | 3/2006 | Hellerstein et al. | |
| 7,016,959 B2 | 3/2006 | Dinh et al. | |
| 7,051,327 B1 | 5/2006 | Milius et al. | |
| 7,055,149 B2 | 5/2006 | Birkholz et al. | |
| 7,093,247 B2 | 8/2006 | Ashworth et al. | |
| 7,143,067 B1 | 11/2006 | Cheston et al. | |
| 7,177,859 B2 | 2/2007 | Pather et al. | |
| 7,181,768 B1 | 2/2007 | Ghosh et al. | |
| 7,185,047 B1 | 2/2007 | Bate et al. | |
| 7,222,218 B2 | 5/2007 | Dutt et al. | |
| 7,251,812 B1 | 7/2007 | Jhanwar et al. | |
| 7,272,815 B1 * | 9/2007 | Eldridge et al. | 717/101 |
| 7,284,243 B2 | 10/2007 | Burgess | |
| 7,302,634 B2 | 11/2007 | Lucovsky et al. | |
| 7,350,075 B1 | 3/2008 | Eastham | |
| 7,353,533 B2 * | 4/2008 | Wright et al. | 726/1 |
| 7,356,679 B1 | 4/2008 | Le et al. | |
| 7,398,480 B2 | 7/2008 | Zimniewicz et al. | |
| 7,398,524 B2 | 7/2008 | Shapiro | |
| 7,424,617 B2 | 9/2008 | Boyd et al. | |
| 7,478,381 B2 | 1/2009 | Roberts et al. | |
| 7,506,337 B2 | 3/2009 | Iyer | |
| 7,506,338 B2 | 3/2009 | Alpern et al. | |
| 7,539,978 B1 | 5/2009 | Haddox et al. | |
| 7,546,594 B2 | 6/2009 | McGuire et al. | |
| 7,571,427 B2 | 8/2009 | Wang et al. | |
| 7,574,706 B2 | 8/2009 | Meulemans et al. | |
| 7,577,722 B1 | 8/2009 | Khandekar et al. | |
| 7,853,609 B2 | 12/2010 | Dehghan et al. | |
| 2001/0023440 A1 * | 9/2001 | Franklin et al. | 709/226 |
| 2001/0029605 A1 | 10/2001 | Forbes et al. | |
| 2002/0007330 A1 | 1/2002 | Kumar et al. | |
| 2002/0007380 A1 | 1/2002 | Bauchot et al. | |
| 2002/0010757 A1 | 1/2002 | Granik et al. | |
| 2002/0019879 A1 | 2/2002 | Jasen et al. | |
| 2002/0100036 A1 | 7/2002 | Moshir et al. | |
| 2002/0147974 A1 | 10/2002 | Wookey | |
| 2002/0156877 A1 | 10/2002 | Lu et al. | |
| 2002/0162030 A1 | 10/2002 | Brezak et al. | |
| 2003/0014656 A1 | 1/2003 | Ault et al. | |
| 2003/0037107 A1 | 2/2003 | Maeda | |
| 2003/0061202 A1 | 3/2003 | Coleman | |
| 2003/0115292 A1 | 6/2003 | Griffin et al. | |
| 2003/0121024 A1 | 6/2003 | Hill et al. | |
| 2003/0126214 A1 | 7/2003 | Oliszewski | |
| 2003/0131073 A1 | 7/2003 | Lucovsky et al. | |
| 2003/0149749 A1 | 8/2003 | Carlucci et al. | |
| 2003/0172127 A1 * | 9/2003 | Northrup et al. | 709/219 |
| 2003/0182414 A1 | 9/2003 | O'Neill | |
| 2003/0195970 A1 | 10/2003 | Dinh et al. | |
| 2003/0200149 A1 | 10/2003 | Gonzalez et al. | |
| 2003/0217123 A1 | 11/2003 | Anderson et al. | |
| 2003/0221190 A1 | 11/2003 | Deshpande et al. | |
| 2004/0003266 A1 | 1/2004 | Moshir et al. | |
| 2004/0006710 A1 | 1/2004 | Pollutro et al. | |
| 2004/0015831 A1 | 1/2004 | Bowhill | |
| 2004/0015946 A1 | 1/2004 | Te'eni et al. | |
| 2004/0025048 A1 | 2/2004 | Porcari et al. | |
| 2004/0049697 A1 | 3/2004 | Edwards, Jr. et al. | |
| 2004/0102182 A1 | 5/2004 | Reith et al. | |
| 2004/0196981 A1 * | 10/2004 | Nakano et al. | 380/280 |
| 2004/0205748 A1 | 10/2004 | Iyer | |
| 2004/0254976 A1 | 12/2004 | Malik et al. | |
| 2004/0255291 A1 | 12/2004 | Sierer et al. | |
| 2005/0002057 A1 | 1/2005 | Oe | |
| 2005/0005152 A1 | 1/2005 | Singh et al. | |
| 2005/0081055 A1 * | 4/2005 | Patrick et al. | 713/200 |
| 2005/0097353 A1 * | 5/2005 | Patrick et al. | 713/200 |
| 2005/0120054 A1 | 6/2005 | Shulman et al. | |
| 2005/0125677 A1 | 6/2005 | Michaelides | |
| 2005/0132179 A1 | 6/2005 | Glaum et al. | |
| 2005/0132349 A1 | 6/2005 | Roberts et al. | |
| 2005/0134896 A1 | 6/2005 | Koga | |
| 2005/0144615 A1 | 6/2005 | Chen et al. | |
| 2005/0235248 A1 | 10/2005 | Victoria et al. | |
| 2005/0246588 A1 | 11/2005 | Deng et al. | |
| 2006/0021065 A1 | 1/2006 | Kamperman et al. | |
| 2006/0047657 A1 | 3/2006 | Frieder et al. | |
| 2006/0059359 A1 | 3/2006 | Reasor et al. | |
| 2006/0090208 A1 * | 4/2006 | Smith | 726/26 |
| 2006/0123101 A1 | 6/2006 | Buccella et al. | |
| 2006/0123414 A1 | 6/2006 | Fors et al. | |
| 2006/0137000 A1 * | 6/2006 | Isaacson | 726/7 |
| 2006/0155838 A1 | 7/2006 | Wu et al. | |
| 2006/0174238 A1 | 8/2006 | Henseler et al. | |
| 2006/0212865 A1 | 9/2006 | Vincent et al. | |
| 2006/0218544 A1 | 9/2006 | Chakraborty et al. | |
| 2006/0230124 A1 | 10/2006 | Belfiore et al. | |
| 2006/0265597 A1 * | 11/2006 | Carey et al. | 713/182 |
| 2006/0277542 A1 | 12/2006 | Wipfel | |
| 2007/0006205 A1 | 1/2007 | Kennedy et al. | |
| 2007/0111726 A1 | 5/2007 | Lambert et al. | |

OTHER PUBLICATIONS

Stephanie Forrest, Computer Immunnology, Oct. 1997, ACm, 88-96.
Garfinkel et al., Practical Unix & Internet Security, ISBN 1-56592-148-8, Chpt. 3.1, 3.2, 4.1, 4.2, Second Ed., Apr. 1996.
Cowan, et al., Immunix & Defcon: Defending Vulnerable Code From Intense Attack; 2003, Immunix, USA.
Cowan et al., SubDomain: Parsimonious Server Security; Proceeding of the 14th Systems Administration Conference; 2000, The Usenix Association, USA.
Cowan et al., Defcon Capture the Flag: Defending Vulnerable Code from Intense Attack, USA.
"A Third Phase of Internet Search"; http://getoutfoxed.com/book|print/46; printed on Aug. 28, 2007; p. 1-2.
"Abstract"; http://getoutfoxed.com/book|print/36; printed on Aug. 28, 2007; p. 1.
"Beyond Outfoxed"; http://getoutfoxed.com/book|print/88; printed on Aug. 28, 2007; p. 1.
"Calculating Levels of Trust"; http://getoutfoxed.com/book|print/112; printed on Aug. 28, 2007; pp. 1-2.
"Comparison to Existing Systems"; http://getoutfoxed.com/book|print/47; printed on Aug. 28, 2007; pp. 1-3.
"Files & Processes"; http://getoutfoxed.com/book|print/84; printed on Aug. 28, 2007; p. 1.
"Firefox Help: How to Manage Profiles"; http://www.mozilla.org/support|firefox|profile; printed on Aug. 27, 2007; pp. 1-4.
"How it Works"; http://getoutfoxed.com/book|print/87; printed on Aug. 28, 2007; p. 1.
"Keeping Your Network Clean"; http://getoutfoxed.com/book|print/108; printed on Aug. 28, 2007; p. 1.
"Novell ZENworks 7 Suite: Your Complete Identity-driven IT Resource Management Solution"; Novell, Inc. Product Guide; http://www.novell.com; (2006); pp. 1-11.
"Novell ZENworks Configuration Management: Complete Systems Management to Lower Your Total Cost of Ownership"; Novell, Inc. Product Guide; http://www.novell.com; 2007; pp. 1-11.
"Novell ZENworks Endpoint Security Management: Total Control from a Single Console"; Novell, Inc. Technical White Paper; http://www.novell.com; (2007); pp. 1-11.
"Novell ZENworks Orchestrator Virtual Machine Management Guide 1.1"; Novell, Inc.; http://www.novell.com; pp. 1-109.

"Novell ZENworks"; Wikipedia, the free encyclopedia; http://en.wikipedia.org/wiki/ZENworks; Printed on Aug. 28, 2007; pp. 1-3.
"Objections"; http://getoutfoxed.com/book|print/35; printed on Aug. 28, 2007; p. 1.
"Objections"; http://getoutfoxed.com/book|print/86; printed on Aug. 28, 2007; p. 1.
"Orchestrating the Data Center with Novell ZENworks"; Novell Solution Flyer; http://www.novell.com; (2007), pp. 1-4.
Tridgell, A. et al., "The rsync algorithm," retrieved at http://www.samba.org/rsync/tech_report/node2.html, Nov. 9, 1998, p. 1.
"Phishing, Spyware, Crapware, Adware"; http://getoutfoxed.com/book|print/85; printed on Aug. 28, 2007; p. 1.
"Search & Browsing"; http://getoutfoxed.com/book|print/83; printed on Aug. 28, 2007; p. 1.
"Small World Networks"; http://getoutfoxed.com/book|print/62; printed on Aug. 28, 2007; pp. 1-2.
"Socially Aware Surfing and Shopping"; http://getoutfoxed.com/book|print/73; printed on Aug. 28, 2007; p. 1.
"Tagging and Folksonomy"; http://getoutfoxed.com/book|print/96; printed on Aug. 28, 2007; p. 1.
"Three Magic Ingredients"; http://getoutfoxed.com/book|print/32; printed on Aug. 28, 2007; p. 1.
"What Outfoxed is Not"; http://getoutfoxed.com/book|print/34; printed on Aug. 28, 2007; p. 1.
"XenFaq—Xen Wiki"; http://www.wiki.xensource.com/xenwiki/XenFaq; printed on Aug. 27, 2007; pp. 1-7.
Adorno, Kerry, "Novell Delivers Industry's Most Comprehensive Systems Management Solution"; Novell, Inc.; http://www.novell.com/news/press/novell-delivers-industrys-most-comprehensive-systems-management-solution; Waltham, Massachusetts; Aug. 14, 2007; p. 1.
Aiken, Peter et al., Microsoft Computer Dictionary; Fifth Edition; Microsoft Press; 2002.
Bailey, E.C., Maximum RPM, Red Hat Inc., 2000, ISBN 1-888172-78-9, http://www.redhat.com/docs/books/max-rpm/index.html, pp. 1-565.
Buytaert, Kris, "Linux Virtualization with Xen"; LinuxDevCenter.com; http://www.linuxdevcenter.com/pub/a/linux|2006/01|26/xen.html; Jan. 26, 2006; pp. 1-3.
Clark, Bryan, "A Moment of Xen: Virtualize Linux to Test Your Apps"; IBM.com; http://www-128.ibm.com/ developerworks/linux|library/l-xen/; Mar. 15, 2005; pp. 1-6.

Cowan, Crispin, Beattie, Steve, Kroah-Hartman, Greg, Pu, Calton, Wagle, Perry, & Gligor, Virgil, "SubDomain: Parsimonious Server Security"; Proceedings of the 14th Systems Administration Conference; The Usenix Association; USA; 2000.
Fusco, John "The Linux-Programmers Toolbox"; Prentice Hall; 2007; Chapter 5, "What Every Developer Should Know about the Kernel," pp. 222-224.
James, Stan; "Outfoxed in a Nutshell"; http://getoutfoxed.com/nutshell; printed on Aug. 28, 2007; pp. 1-3.
James, Stan; "Outfoxed in a Nutshell: What does Outfoxed add to my Browser?"; http://getoutfoxed.com/nutshell/ node/106; printed on Aug. 28, 2007; pp. 1-3.
James, Stan; "What is Outfoxed?"; http://getoutfoxed.com/about; printed on Aug. 28, 2007; pp. 1-2.
Newham, C. et al., "Learning the Bash Shell," 2nd Ed., O'Reilly & Associates, 1998, p. 13.
Nemeth, Evi et al., "Linux Administration Handbook"; Prentice Hall; 2006; Chapter 12—TCP/IP Networking, pp. 276-277.
Silva, G.N., APT HOWTO, Chapter 5- Getting Information about packages, Aug. 2001, http://web.archive.org/web/20010911133902/http://www.debian.org/doc/manuals/apt-howto-ch-sourcehandling.en.html.
Silva, G.N., APT HOWTO, Chapter 6—Working with source packages, Aug. 2001, http://web.archive.org/web/20010911133902/http://www.debian.org/doc/manuals/apt-howto/ch-sourcehandling.en.html.
Rosen, Rami, "Introduction to the Xen Virtual Machine"; LinuxJournal.com; http://www.linuxjournal.com/article/8540; Sep. 1, 2005; pp. 1-10.
Tanenbaum, Andrew S., "Computer Networks"; Third edition; Prentice Hall; 1996; pp. 29, 44.
Chapman et al., "Contemplating systemic software reuse in project centric company", ACM SAICSIT, 2008, pp. 16-26.
Gill et al., "Resuability issued in component based development", ACM, 2003, pp. 1-5.
Lymer et al., "Experience in using business scenarios to access COTS components in integrated solutions", ACM, 2005, pp. 1-15.
YourDictionary.com, Remote boot, retrieved on Jan. 5, 2010 from https:///www.yourdictionary.com/computer/remote-boot.
Bhuta et al., "A framework for identification and resolution of interoperability mismatchs in COTS based system", IEEE IWICSS, 2007, pp. 1-6.

* cited by examiner

SYNTHESIZED ROOT PRIVILEGES

RELATED APPLICATION DATA

This application is a continuation-in-part of commonly assigned, U.S. patent application Ser. No. 11/018,514, titled "Method Binding Network Administrators as the Root User on Linux", filed Dec. 20, 2004, now abandoned, which is hereby incorporated by reference for all purposes.

FIELD OF THE INVENTION

This invention pertains to resource access, and more particularly to allowing users root access to resources based on the resource requested.

BACKGROUND OF THE INVENTION

Traditional computer operating systems are designed to recognize different levels of authority to use the computer. A typical computer operating system recognizes two such levels. The first level, which can be called the root or administrator level, allows the user to make any changes he or she wants to the computer. Changes that affect multiple users are typically reserved to administrative users, because of the potential to impact multiple users in a negative manner. For example, administrative users are typically reserved the right to install device drivers, and to configure accounts for new users. The second level is the level assigned to most typical users. These users are limited in what they can do. Essentially, regular users can make changes that affect their personal files, including granting other users access to their files, but otherwise cannot make changes. Depending on the operating system, some computers recognize other intermediate levels, which grant some users rights that are similar to administrative rights, but are not as broad in scope (or are more limited in number).

While this structure generally works very well, it does have limitations. For example, sometimes it is desirable to let users have control over particular resources (e.g., one application), as if they were administrative users, but limit their control over other resources (e.g., another application). With the structure described above, this level of control is not possible. If a user is an administrative user, they can access every resource just like any other administrative user; if a user is a limited user, they can access every resource only to the extent other limited users can do so.

Accordingly, a need remains for a way to give users levels of access to resources that depends on the resource, to address these and other problems associated with the prior art.

SUMMARY OF THE INVENTION

The invention is a method and apparatus for performing authentication of users. When a user requests access to a resource, such as an application, the system attempts to authenticate the user. Assuming the user is successfully authenticated, the system determines if the user is authorized to access the resource as an administrator. If the user is authorized to access the resource as an administrator, then the system assigns the access attempt an effective user ID (eUID) appropriate for an administrative user. Otherwise, the system determines the user's user ID (UID) and assigns that value to the eUID for the access.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
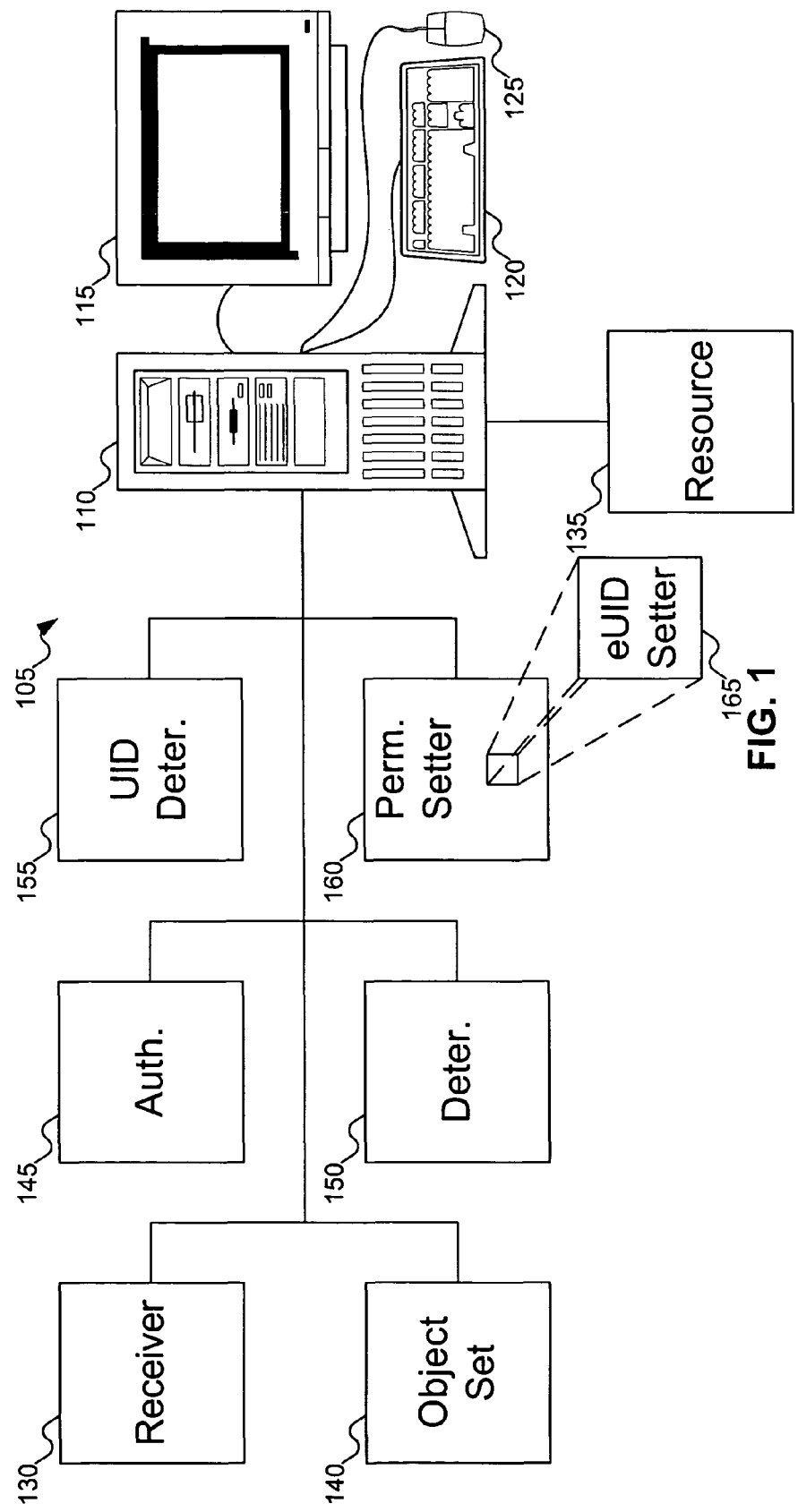
FIG. 1 shows a machine equipped to provide administrator access to resources, according to an embodiment of the invention.

FIG. 1 shows a machine equipped to provide administrator access to resources, according to an embodiment of the invention. In FIG. 1, machine 105 is shown as including computer 110, monitor 115, keyboard 120, and mouse 125. A person skilled in the art will recognize that other components can be included with machine 105: for example, other input/output devices, such as a printer (not shown). In addition, FIG. 1 does not show some of the conventional internal components of machine 105; for example, a central processing unit, memory, etc.

To support user authentication and access control, machine 105 includes various elements. Receiver 130 is responsible for receiving a request from a user process to access a resource, such as resource 135. Object set 140 includes information about users and resources, including which users are considered administrative users of which resources. Authenticator 145 is responsible for performing the authentication of the user. Determiner 150 determines if the user is considered an administrative user of the resource. UID determiner 155 is responsible for determining the user's UID, if the user is not an administrator of the resource. And permission setter 160 is responsible for setting the user's permission level associated with the use of the resource.

Now that the elements of FIG. 1 have been introduced, they can be discussed in greater detail. Receiver 130 is responsible for receiving a user's request to access a resource. As an example of a type of request, a user might attempt to establish a shell to log in to a server. Or the request might be to access a web based enterprise management (WBEM) server. Or, the application might be a request to access a file. A person skilled in the art will recognize other possible types of requests that can be received by receiver 130.

Figure 2:
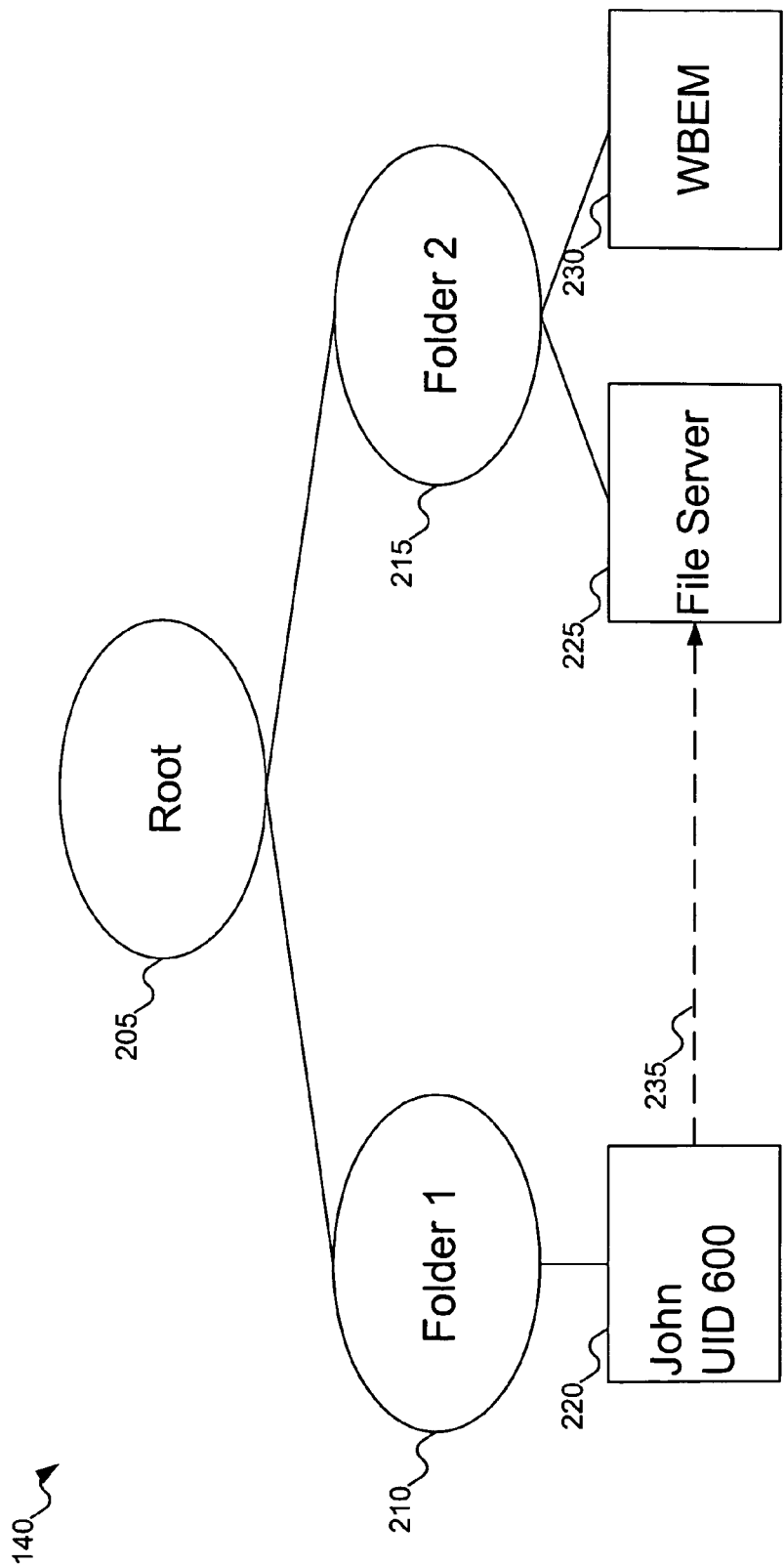
FIG. 2 shows the object set of FIG. 1 constructed as a container hierarchy, the object set indicating which resources a user can access as an administrator, according to an embodiment of the invention.

Object set 140, as mentioned above, stores information about the user and the resource. Object set 140 can be configured in several different ways. One configuration uses a container hierarchy. As shown in FIG. 2, object set 140 includes multiple containers. In FIG. 2, root container 205 includes two sub-containers: container 210 and container 215. In FIG. 2, container 210 is shown as including user object 220, and container 215 is shown as including resource objects 225 and 230.

Although FIG. 2 shows only two containers, a person skilled in the art will recognize that there can be any number of containers, and they can be in any configuration. For example, within, say, container 210 there can be another container, in which case the containers are said to be nested. In addition, a container can store objects of any type, containers simply being one type of object. Thus, a single container can store a nested container alongside user objects, resource objects, and any other varieties of object.

User object 220 stores information about a particular user. User object 220, among other data, stores the user's name ("John") and his UID ("600"). In addition, user object 220 can store authentication information, such as the user's password, although authentication is usually handled by authenticator 145 in FIG. 1.

FIG. 2 also shows link 235. Link 235 represents the fact that the user named John is considered an administrative user of the machine represented by object 225 (i.e., the file server application). In contrast, because object 220 is not linked to object 230, the user named John is not considered an administrative user of the WBEM application.

Although FIG. 2 represents the fact that the user named John is considered an administrative user of the file server application by link 235, a person skilled in the art will recognize that there are many different ways in which a user object can be identified as an administrative user for an application. For example, user object 220 can have a list (either part of user object 220 or linked to user object 220) of applications for which the user named John is to be considered an administrative user. Or, object 225 can include a list (either part of object 225 or linked to object 225) that identifies users who are to be considered administrative users of the application: such a list can be termed a "white list". Or, object 225 can include a list (either part of object 225 or linked to object 225) of users who are not to be considered administrative users of the application: such a list can be termed a "black list". The white list and black list can be combined with other features of the system, or can stand by themselves. For example, the system can assume that only administrative users of the system can be administrative users. Thus, if a user is not an administrative user, the system can automatically assume the user is not an administrative user, and not bother to check the list. But if the user is an administrative user, the system can check the appropriate list to determine if the user is entitled to administrative access to the application.

Returning to FIG. 1, authenticator 145 performs authentication of the user. Authentication can be performed using any desired authentication technique, and any desired authentication system. For example, authentication can be performed using, among other alternatives, the Lightweight Directory Access Protocol (LDAP), implemented as a Linux® User Management (LUM) module. (Linux is a registered trademark of Linus Torvalds.) In a Linux system, the authentication module often uses Pluggable Authentication Module (PAM). A PAM LDAP module is just one of the many PAM modules available; a person skilled in the art will recognize that other authentication modules can be substituted for the PAM LDAP module. Further, LUM is a specific instance of a PAM LDAP module; a person skilled in the art will recognize that there are other implementations of a PAM LDAP module that can be substituted for the LUM.

Determiner 150 is responsible for determining whether the user is entitled to administrative access to the resource. As discussed above with reference to FIG. 2, object set 140 can indicate whether the user is entitled to administrative access in a variety of different ways. Provided that it is known how object set 140 stores information about which users are entitled to administrative-level access, determiner 150 can be easily configured to access this information for use by the system.

UID determiner 155 is responsible for determining the UID of the user. In one embodiment, all administrative users use a single administrative level access to the system. For example, in some Linux systems, all administrative users use a single username and password. This administrative username is associated with an administrative UID; all other usernames are assigned other UIDs, which are not considered administrative UIDs. For such a system, UID determiner 155 would determine the UID based on the username provided to log in to the system. If the user used the administrative username, then the administrative user object (there would be at most one for each machine) in object set 140 would be accessed, and the administrative UID returned by UID determiner 155. But if the user logged in using a non-administrative username, then UID determiner 155 would locate the appropriate user object in object set 140, and determine the user's UID from that object.

In other embodiments, it is possible for multiple users all to be administrative users, without sharing a common username and password. For example, commonly assigned U.S. patent application Ser. No. 11/018,514, titled "Method Binding Network Administrators as the Root User on Linux", filed Dec. 20, 2004, hereby incorporated by reference, describes a way to permit users to be treated as administrative users without sharing a single administrative username and password. In this embodiment, UID determiner 155 determines the UID of the user from the user's object in object set 140, but upon recognizing that the user is an administrative user, can use the administrative UID.

Finally, permission setter 160 is responsible for setting the appropriate permission level to access the resource. Where the permission level is set using UIDs, permission setter 160 can include eUID setter 165 to control the permissions. An effective UID (eUID) provides a way to change the effective operation of the system, without actually changing the UID for the session. For example, the user can be given access to the resource with his or her normal UID, but with an effective UID of the administrative user. By using the eUID in this manner, the user can be given administrative-level access to the resource, even though the UID being used is the user's normal (i.e., non-administrative) UID.

Figure 3:
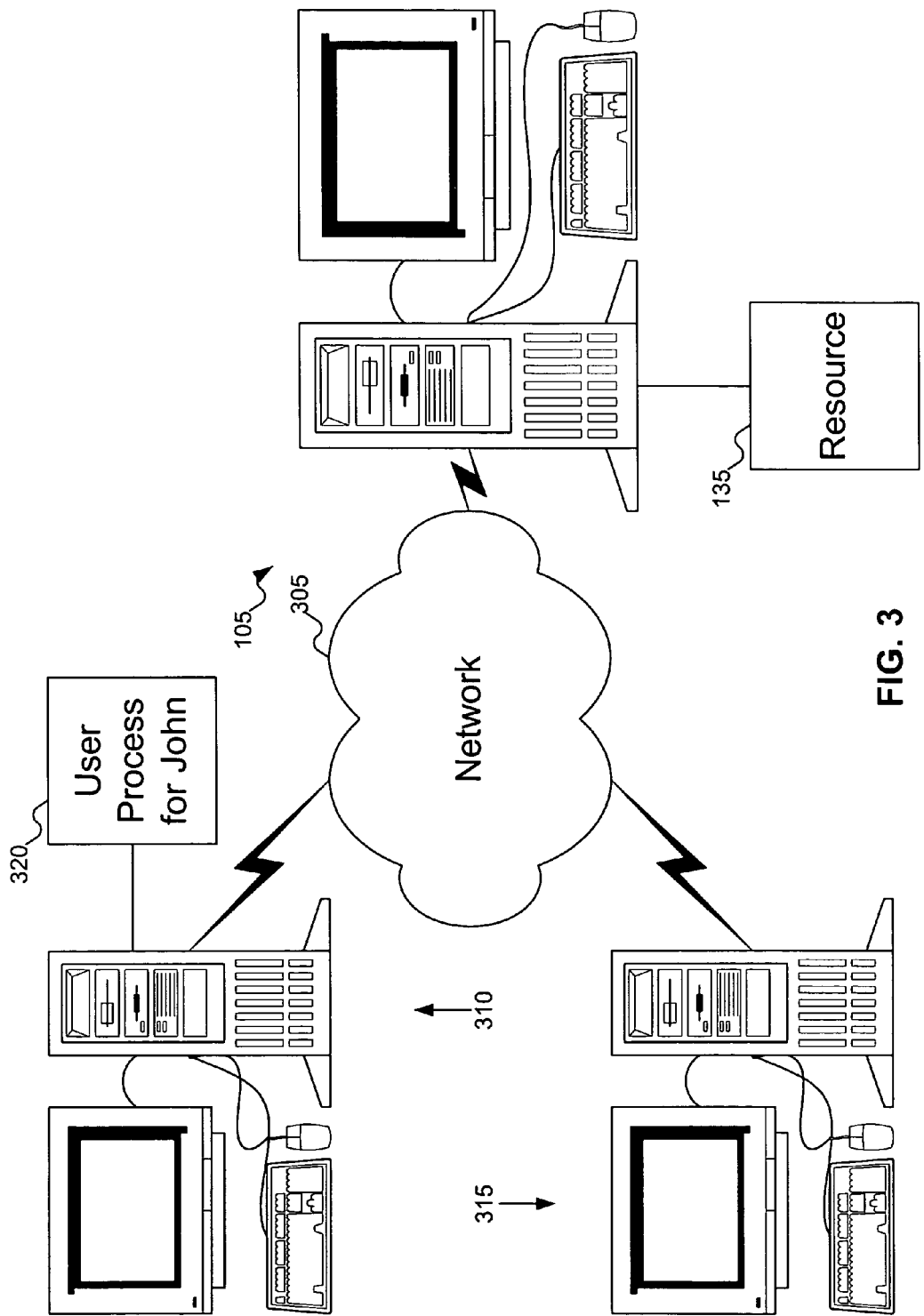
FIG. 3 shows the machine of FIG. 1 connected via a network to other computers, according to an embodiment of the invention.

FIG. 3 shows machine 105 connected to network 305, the network connecting several other computers. Two computers, 310 and 315, are shown, but a person skilled in the art will recognize that there can be any number of machines connected via the network. Computer 310 is shown including user process 320, a process for a user named John. This situation can arise in several ways. For example, computer 310 might be a workstation, which John is using. Or, computer 310 might be a server carrying out some process for the user John, who is using another computer to request the process. (In this latter situation, the computer used by John is often called a client, but a person skilled in the art will recognize that the terms "client" and "server" should not be interpreted in any way that might limit the varieties of machines in either role.) A person skilled in the art will recognize other ways in which computer 310 might carry out the process on John's behalf.

User process 320 can make a request of resource 135 on machine 105, even though user process 320 is running on another computer. Assuming that machine 105 is configured to allow remote access to resource 135, there is no requirement that user process 320 be running on machine 105.

Although FIG. 3 (and FIG. 1) shows machine 105 and computers 310 and 315 as ordinary computers and network 305 as a typical network, a person skilled in the art will recognize that the equipment can take any desired form. For example, computer 310 might be a personal digital assistant (PDA). Or computer 315 might be a device including an embedded processor. And network 305 can use any desired communication protocol and could be configured as a wired or wireless network, connecting machine 305 and computers 310 and 315 (and possibly other computers) using direct connections, a Local Area Network (LAN), Wide Area Network (WAN), Metropolitan Area Network (MAN), or using a public network, such as the Internet, among other possibilities. If using a wireless network, network 305 might be Bluetooth network or a network offering connectivity using the IEEE 802.11 a/b/g/n standards, among other possibilities.

Depending on the configuration of the equipment and the location of the resource in question, a system that embodies the invention can include a single computer (including both resource 135 and user process 320), in which case network 305 can be omitted. Or a system embodying the invention can include multiple machines, connected in some manner, with resources and processes distributed among the machine. A person skilled in the art will recognize other possible configurations.

Figure 4:
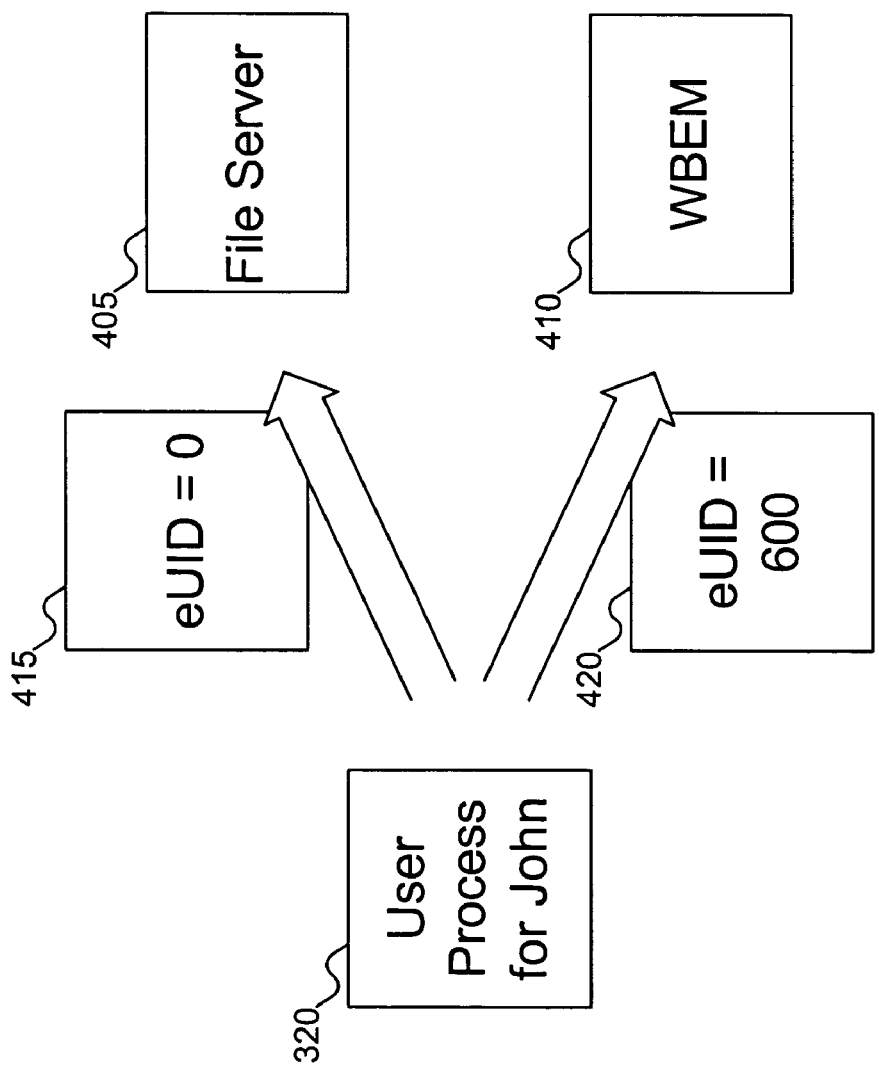
FIG. 4 shows the user being granted different levels of access to different resources the machine of FIG. 1, according to an embodiment of the invention.

FIG. 4 shows the user being granted different levels of access to different resources the machine of FIG. 1, according to an embodiment of the invention. In FIG. 4, the user named John is running user process 320. In the course of execution, user process 320 requests access to two different resources: file server 405, and WBEM 410. The user named John, and resources 405 and 410 are, of course, both represented by objects in the object set shown in FIG. 2. According to the information in the object set of FIG. 2, the user named John is entitled to administrative-level access to file server 405, but not to WBEM application 410. Accordingly, the eUID for the access attempt to the file server is set to administrative-level access, as shown by permission box 415, but the eUID for the access attempt to the WBEM application is set to regular access, as shown by permission box 420.

Figure 5A:
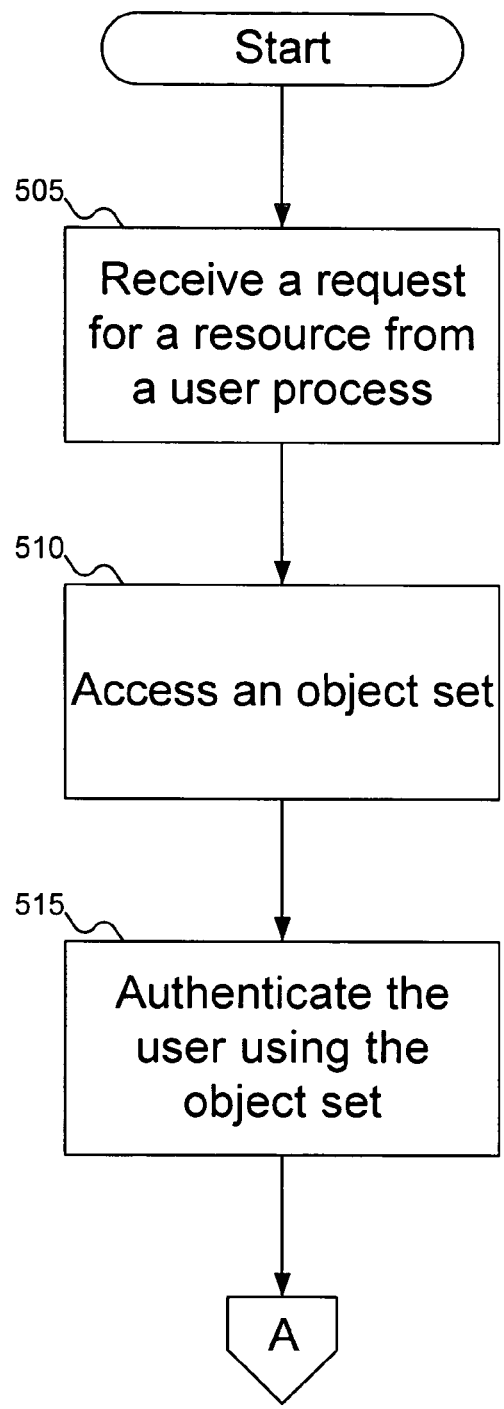
FIGS. 5A-5B show a flowchart of the procedure used by the machine of FIG. 1 to authenticate users and of the machine, according to an embodiment of the invention.
Figure 5B:
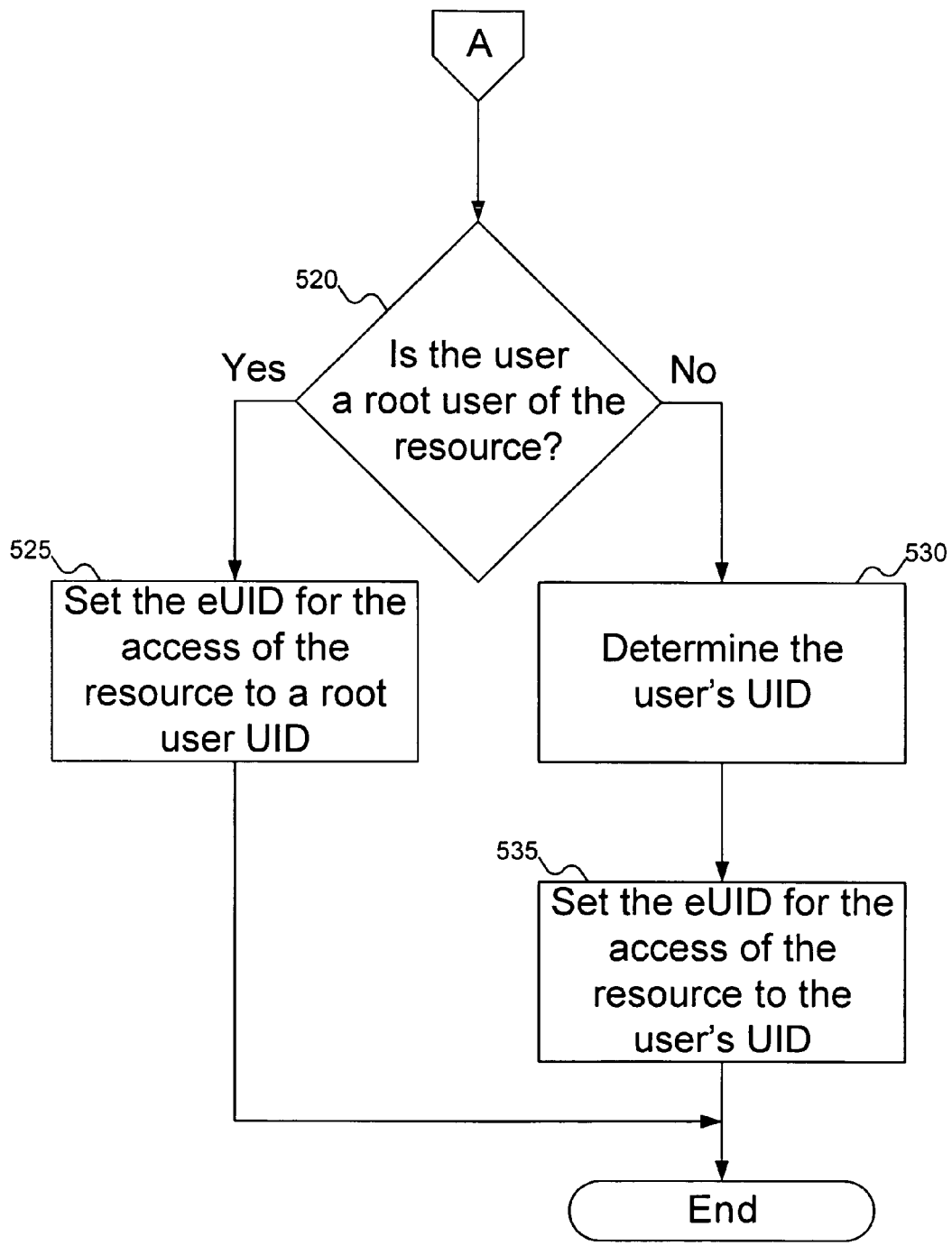

FIGS. 5A-5B show a flowchart of the procedure used by the machine of FIG. 1 to authenticate users and of the machine, according to an embodiment of the invention. In FIG. 5A, at step 505, the system receives a request from a user process to access a resource. At step 510, the system accesses the object set. At step 515, the system authenticates the user using the object set. As discussed above with reference to FIG. 1, authentication can take any desired form, and is designed to verify that the user is who he says he is.

At step 520 (FIG. 5B), the system determines if the user is considered to be an administrator of the resource. If so, then at step 525, the system sets the effective user ID for the access attempt to indicate administrative-level access. Otherwise, at step 530, the system determines the user's normal UID, and at step 535 sets the eUID for the access attempt to the user's normal UID.

It is worth noting that the system can do whatever is appropriate with respect to the UID of the access attempt. For example, if the system requires that the user's UID be set to root to grant any privileged access to the resource, then if the user is granted administrative-level access, the UID can be set to the administrator. On the other hand, if the system can grant administrative-level access to the resource regardless of the setting of the UID, then the system can set the UID to the user's normal IUD, even while setting the eUID to grant administrative-level access to the resource. Of course, if the user is to be granted only non-administrative-level access to the resource, then the system will typically set the UID to user's normal UID.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
a receiver to receive a request from a user process to access a resource;
an object set, including at least a first object representing a user and a second object representing the resource;
an authenticator to authenticate the user using the first object in the object set;
a determiner to determine if there is a relationship between the first object and the second object in the object set; and
a permission setter to set a permission level for the user process to use the resource according to the relationship,
wherein the resource is an application to which certain users are to be granted administrative access based on information in the first object in the object set, dependent on the resource, and independent of a username or user ID (UID) associated with the first object in the object set.

2. An apparatus according to claim 1, wherein the permission setter includes an eUID setter to set an effective user ID (eUID) for a use of the resource by the user.

3. An apparatus according to claim 2, wherein the eUID setter to set the eUID to a root user ID if the determiner determines that there is a relationship between the first object and the second object in the object set.

4. An apparatus according to claim 2, wherein:
the apparatus further comprises a UID determiner to determine a user ID (UID) from the first object, if the determiner determines that there is no relationship between the first object and the second object in the object set; and
the eUID setter is to set the eUID for the use of the resource by the user to the UID from the first object.

5. An apparatus according to claim 1, further comprising:
a UID determiner to determine a user ID (UID) from the first object; and
a UID setter to set a user ID (UID) for the use of the resource by the user to the UID from the first object.

6. An apparatus according to claim 1, wherein:
the receiver is to receive a second request from the user process to access a second application;
the object set further includes a third object representing the second application;
the determiner is to determine if there is a second relationship between the first object and the third object in the object set; and
the permission setter is to set a second permission level for the user process to use the second application according to the second relationship.

7. An apparatus according to claim 6, wherein:
the determiner is to determine that the first object indicates that the user is a root user of the application, and that the user is not a root user of the second application;
the apparatus further comprises a UID determiner to determine a user ID (UID) from the first object; and
the permission setter includes an effective user ID (eUID) setter to set an eUID for use of the application by the user to a root user UID, and to set an eUID for use of the second application by the user to the UID from the first object.

8. An apparatus according to claim 1, wherein the object set includes a container hierarchy, the container hierarchy including at least a first container, the first container including at least a second container, the first object and the second object each in one of the first container and the second container.

9. A computer-implemented method, comprising:
receiving a request by a user to access a resource;
accessing an object set, the object set including at least a first object representing the user and a second object representing the resource;
authenticating the user using the first object in the object set;
determining if there is a relationship between the first object and the second object in the object set, including determining if the first object indicates that the user is a root user of the resource based on information in the first object in the object set, dependent on the resource, and independent of a username or user ID (UID) associated with the first object in the object set; and
if there is a relationship between the first object and the second object in the object set, using the relationship to control a permission level for the user with respect to the resource, including permitting the user to act as the root user of the resource.

10. A method according to claim 9, wherein permitting the user to act as the root user of the resource includes setting an effective user ID (eUID) for use of the resource by the user to a root user ID.

11. A method according to claim 9, further comprising, if there is no relationship between the first object and the second object in the object set:
determining a user ID (UID) from the first object in the object set; and
setting an effective user ID (eUID) for use of the resource by the user to the UID from the first object in the object set.

12. A method according to claim 9, further comprising:
determining a user ID (UID) from the first object in the object set; and
setting a user ID (UID) for use of the resource by the user to the UID from the first object in the object set.

13. A method according to claim 9, wherein receiving a request includes receiving the request by the user to access a first application.

14. A method according to claim 13, further comprising:
receiving a second request by the user to access a second application;
accessing the object set, the object set including at least the first object representing the user, the second object representing the first application, and a third object representing the second application;
authenticating the user using the first object in the object set;
determining if there is a relationship between the first object and the third object in the object set; and
if there is a relationship between the first object and the third object in the object set, using the relationship to control a second permission level for the user with respect to the second application.

15. A method according to claim 14, wherein:
determining if there is a relationship between the first object and the second object in the object set includes identifying that the first object indicates that the user is a root user of the first application;
setting an effective user ID (eUID) for use of the first application by the user to a root user ID;

determining that there is no relationship between the first object and the third object in the object set;
determining a user ID (UID) from the first object in the object set; and
setting an effective user ID (eUID) for use of the second application by the user to the UID from the first object in the object set.

16. A method according to claim 9, wherein:
accessing an object set includes accessing a container hierarchy, the container hierarchy including at least a first container, the first container including at least a second container, and the first object and the second object each in one of the first container and the second container;
authenticating the user includes authenticating the user using the first object in the container hierarchy; and
determining if there is a relationship between the first object and the second object in the object set includes determining if there is a relationship between the first object and the second object in the container hierarchy.

17. An article, comprising:
a non-transitory storage medium, said non-transitory storage medium having stored thereon instructions, that, when executed by a machine, result in:
receiving a request by a user to access a resource;
accessing an object set, the object set including at least a first object representing the user and a second object representing the resource;
authenticating the user using the first object in the object set;
determining if there is a relationship between the first object and the second object in the object set, including determining if the first object indicates that the user is a root user of the resource based on information in the first object in the object set, dependent on the resource, and independent of a username or user ID (UID) associated with the first object in the object set; and
if there is a relationship between the first object and the second object in the object set, using the relationship to control a permission level for the user with respect to the resource, including permitting the user to act as the root user of the resource.

18. An article according to claim 17, wherein permitting the user to act as the root user of the resource includes setting an effective user ID (eUID) for use of the resource by the user to a root user ID.

19. An article according to claim 17, wherein the non-transitory storage medium has further instructions stored thereon that, when executed by the machine result in, if there is no relationship between the first object and the second object in the object set:
determining a user ID (UID) from the first object in the object set; and
setting an effective user ID (eUID) for use of the resource by the user to the UID from the first object in the object set.

20. An article according to claim 17, wherein the non-transitory storage medium has further instructions stored thereon that, when executed by the machine result in:
determining a user ID (UID) from the first object in the object set; and
setting a user ID (UID) for use of the resource by the user to the UID from the first object in the object set.

21. An article according to claim 17, wherein receiving a request includes receiving the request by the user to access a first application.

22. An article according to claim 21, wherein the non-transitory storage medium has further instructions stored thereon that, when executed by the machine result in:
receiving a second request by the user to access a second application;
accessing the object set, the object set including at least the first object representing the user, the second object representing the first application, and a third object representing the second application;
authenticating the user using the first object in the object set;
determining if there is a relationship between the first object and the third object in the object set; and
if there is a relationship between the first object and the third object in the object set, using the relationship to control a second permission level for the user with respect to the second application.

23. An article according to claim 22, wherein:
determining if there is a relationship between the first object and the second object in the object set includes identifying that the first object indicates that the user is a root user of the first application;
setting an effective user ID (eUID) for use of the first application by the user to a root user ID;
determining that there is no relationship between the first object and the third object in the object set;
determining a user ID (UID) from the first object in the object set; and
setting an effective user ID (eUID) for use of the second application by the user to the UID from the first object in the object set.

24. An article according to claim 17, wherein:
accessing an object set includes accessing a container hierarchy, the container hierarchy including at least a first container, the first container including at least a second container, and the first object and the second object each in one of the first container and the second container;
authenticating the user includes authenticating the user using the first object in the container hierarchy; and
determining if there is a relationship between the first object and the second object in the object set includes determining if there is a relationship between the first object and the second object in the container hierarchy.

25. An apparatus according to claim 1, wherein the certain users each use different usernames.

26. An apparatus according to claim 1, wherein the determiner is to determine if there is a relationship between the first object and the second object in the object set by accessing information in the first object in the object set.

27. A method according to claim 9, wherein determining if there is a relationship between the first object and the second object in the object set includes determining if there is a relationship between the first object and the second object in the object set by accessing information in the first object in the object set.

28. An article according to claim 17, wherein determining if there is a relationship between the first object and the second object in the object set includes determining if there is a relationship between the first object and the second object in the object set by accessing information in the first object in the object set.

29. A method according to claim 9, wherein receiving a request by a user to access a resource includes receiving the request by the user to access an application to which certain users are to be granted administrative access based on information in the first object in the object set, dependent on the resource, and independent of a username or user ID (UID)

associated with the first object in the object set, and wherein the certain users each use different usernames.

30. An article according to claim 17, wherein receiving a request by a user to access a resource includes receiving the request by the user to access an application to which certain users are to be granted administrative access based on information in the first object in the object set, dependent on the resource, and independent of a username or user ID (UID) associated with the first object in the object set, and wherein the certain users each use different usernames.

* * * * *